Sept. 6, 1955        J. S. PAGE        2,717,004
MULTIPLE VALVE
Filed April 18, 1949        2 Sheets-Sheet 1
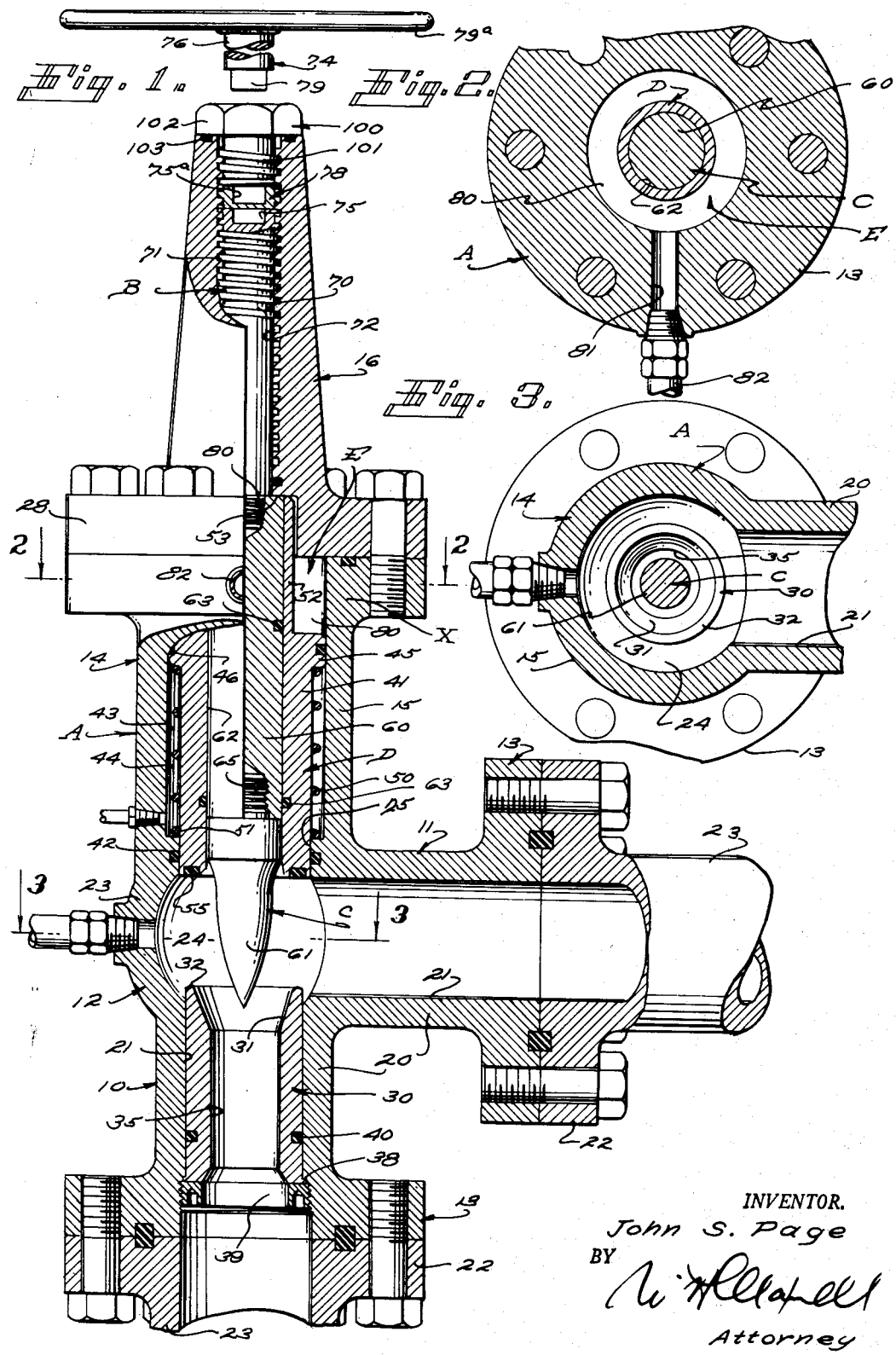
INVENTOR.
John S. Page
BY
Attorney Sept. 6, 1955     J. S. PAGE     2,717,004
MULTIPLE VALVE
Filed April 18, 1949     2 Sheets-Sheet 2
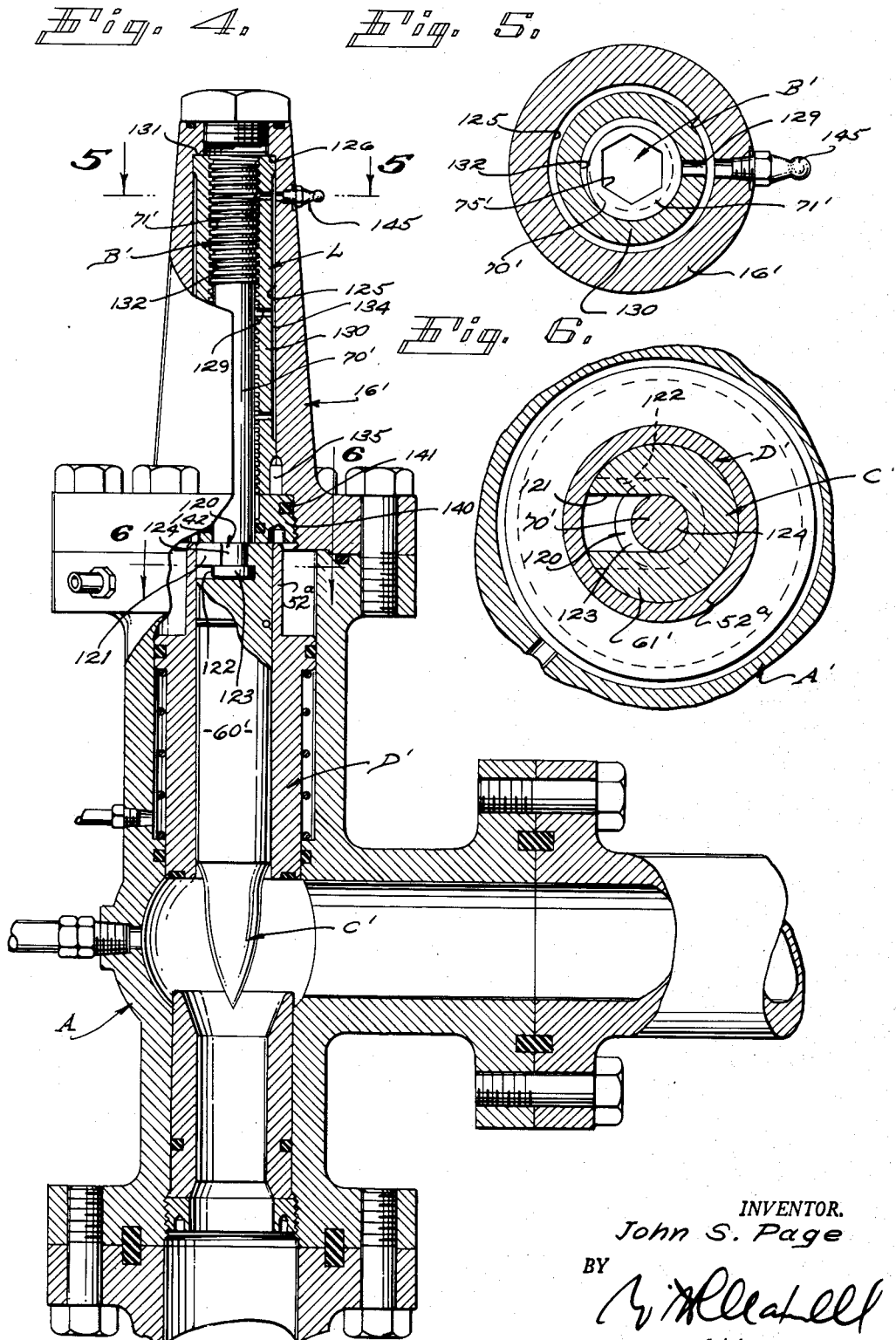
INVENTOR.
John S. Page
BY
Attorney

United States Patent Office 2,717,004
Patented Sept. 6, 1955

2,717,004

MULTIPLE VALVE

John S. Page, Long Beach, Calif., assignor to Page Oil Tools Inc., Long Beach, Calif., a corporation of California Application April 18, 1949, Serial No. 88,211

12 Claims. (Cl. 137—637)

This invention has to do with a multiple valve and it is particularly concerned with a valve involving a plurality of closures which are independently operable. It is a general object of the invention to provide a valve of the general character referred to which is of simple, practical construction, which is dependable in operation, and which may be operated to regulate and to cut off flow, as desired.

There are various situations where it is advantageous to employ a multiple valve, that is, a valve having a plurality of flow controlling elements. As an example of such a situation it is often advantageous to provide a pipe line with a valve including means serving to regulate flow and also means operable to shut off or completely stop flow.

It is a general object of this invention to provide a multiple valve of the general character referred to including two closures or valve members that can be operated independently, one of which is such as to effectively and dependably regulate flow while the other is such as to operate effectively as a positive stop or shut off for the flow.

It is a general object of the invention to provide a valve of the general character referred to wherein one of the flow control elements or valves is of the needle type, while the other is of the slide type.

It is a further object of this invention to provide a valve of the general character referred to wherein the two valves or working parts that control flow are related so that they are concentric and operate or reciprocate relative to each other, one being guided by the other.

Another object of the invention is to provide a valve of the general character referred to including two independently operable means for actuating the valves, one of which means is a manually operated means while the other is a fluid pressure actuated means suitable for operation by pressure supplied from a point removed from the structure.

It is a further object of the invention to provide a valve of the general character referred to wherein there is a single or common element, preferably in the form of a liner, which carries the seats of the two valves.

Another object of the invention is to provide a structure of the character described with a simple dependable coupling between the valve or needle and the operating stem therefor by which the valve is free to rotate relative to the stem.

A further object provides a simple dependable structure by which the valve stem is operated and effective lubrication is provided for the thread by which the stem is moved.

The various objects and features of my invention will be fully understood from the following detailed description of typical preferred forms and applications of the invention, throughout which description reference is made to the accompanying drawings, in which:

Fig. 1 is a view showing the structure provided by the present invention with parts broken away to show in section, the flow controlling valve being shown in operating position while the shut-off valve is shown fully retracted or out of operation. Fig. 2 is an enlarged plan section taken as indicated by line 2—2 on Fig. 1. Fig. 3 is an enlarged plan section taken as indicated by line 3—3 on Fig. 1. Fig. 4 is a view showing another form of the present invention being a view similar to Fig. 1. Fig. 5 is an enlarged plan section taken as indicated by line 5—5 on Fig. 4, and Fig. 6 is an enlarged section taken as indicated by line 6—6 on Fig. 4.

The structure provided by this invention includes, generally, a body carrying a plurality of valves, the body being such as to provide a flow passage and the valves being such that one acts primarily to control or regulate flow through the body while the other is particularly effective as a stop or shut-off valve for completely stopping flow through the body. The structure further includes operating means for the valves, it being preferred that there be a separate operating means B and D for the valves, as will be hereinafter described.

The body A provided by the present invention involves, generally, two angularly related ducts 10 and 11, a chamber 12 connecting the ducts, coupling means 13 at the outer ends of the ducts, a lateral extension 14 communicating with the chamber 12 and preferably including a cylindrical part 15 joined to the chamber 12 and projecting therefrom, and a cap 16 joined to the part 15 and projecting therefrom.

The ducts 10 and 11 are preferably angularly related primarily to provide an arrangement whereby the extension of the body formed by the part 15 of the cap 16 may be disposed opposite and in line with one of the ducts, as for instance the duct 10, as shown in Fig. 1 of the drawings. It is to be understood that the ducts 10 and 11 and part 15 of body A may be related to each other at various angles as circumstances require. In the particular case illustrated the ducts 10 and 11 are simple, straight, tubular parts arranged at right angles to each other and each involves a cylindrical wall 20 defining a round opening 21. The coupling means 13 provided at the outer ends of the ducts 10 and 11 may be of any suitable form or type. In the drawings I have shown them as flanges suitable for making connection with the flanges 22 on pipes 23 joined to the valve.

The chamber portion 12 of the body is formed by a spherically curved wall 23 which defines or establishes a flow handling cavity 24 connecting the inner ends of the ducts 10 and 11.

The inner or cylindrical part 15 of the lateral extension 14 provided on the body is preferably formed integral with the parts just described so that it projects laterally from the chamber 12 at a point opposite the duct 10. The cylindrical extension 15 is provided with a cylindrical opening or bore 25 which is concentric with the duct 10.

The cap 16 serves primarily to carry one of the operating means, preferably the operating means B. The cap is shown separable from the cylindrical part 15, being attached at the outer end thereof by means of a suitable flange connection 28.

The present invention contemplates, broadly, a structure involving a plurality of valves handling the flow of fluid through the body A and in the form illustrated it involves two simple valves, one a valve C intended primarily to control or regulate flow although capable of completely shutting off flow if necessary or desired. The other valve D preferably works entirely independent of the valve C and is such as to serve primarily as a shut-off valve acting to completely stop or shut off flow through the body A.

In the form of the invention illustrated the valves C and D are of two different types, one being a needle valve and the other a piston or slide valve. The valve C is shown as a needle valve while the valve D is a piston or slide valve. Further, in accordance with the preferred form of the present invention the valves C and D are related or combined as a unit, being preferably concentric with each other and one supported from or by the other.

Each of the valves above referred to is provided or cooperates with a fixed or stationary seat, and the seats for the two valves are preferably on or carried by a common stationary member 30 in the form of a liner carried by the body A. In the particular case illustrated the liner 30 is carried in the opening 21 of duct 10 so that its inner end portion opposes the valves C and D which are carried by the extension 14 of the body. The valves C and D, being concentric, the seats thereof are concentric, there being a seat 31 to receive the valve C and a seat 32 to receive the valve D.

The extreme inner end of the sleeve 30 is finished to form the annular seat 32 while the inner end portion of the opening 35, through the sleeve 30, is tapered to form the seat 31. Through this arrangement and relationship of parts the seats 31 and 32 are concentric, are at the inner portion of the liner 30 and one is located within the other, that is, the seat 31 is, in effect, within the seat 32.

The liner 30 is preferably finished to slidably fit into the opening 21 of the duct 10 and, in practice, a suitable packing or sealing element 40 may be provided between the liner and duct to prevent leakage at this point. The liner 30 may be retained in the duct 10 in any suitable manner or by any suitable means. In the case illustrated the liner is limited in its inward movement in the opening 21 by a flange 38 and a retaining ring 39 is threaded into the outer end portion of the opening 21 to maintain the liner in its innermost position.

The shut-off valve D is characterized by an elongate tubular part or sleeve 41 slidably supported in the cylindrical part 15 of extension 14. As shown in Fig. 1 of the drawings, the sleeve 41 is slidably carried in the bore or opening 25 of part 15, at which point it may be sealed or packed by a suitable packing element 42. The extension 15 has a counterbored portion 43 entering it from its upper end establishing a cavity 44 between the sleeve 41 and the part 15. The outer end portion of the sleeve 41 is provided with a flange 45 that slidably fits in the counterbore 43 and which is preferably sealed or packed where it engages the counterbore by packing 46.

A helical compression spring 50 surrounds the sleeve 41 and acts between the shoulder 51, where the counterbore terminates, and the flange 45 to normally yieldingly urge the sleeve upwardly, and it normally holds the sleeve in the position shown in Fig. 1 of the drawings. An extension or stop 52 projects upwardly from the sleeve 41 and engages a shoulder 53 in the cap 16 to limit upward movement of the sleeve.

The lower end of the sleeve 41 is finished to present an annular face for cooperation with the seat 32 and in the preferred construction this face is recessed and carries a packing ring 55 which makes contact with the seat 32 to establish a fluid-tight connection therewith.

From the foregoing description it will be apparent that the valve D is, in effect, a simple slide or sleeve valve normally held in a cooperative or elevated position, as shown in Fig. 1, and freely operable to a closed position where it engages or seats on the seat 32 and thus positively shuts off flow through the body A.

The regulating valve C in the form illustrated in the drawings involves an elongate shank 60 carrying a tapered head 61 which cooperates with the tapered seat 31. The shank 60 is an elongate part round in cross-section and slidably fitted in an opening 62 in the sleeve 41. In the preferred arrangement suitable packing or sealing rings 63 are provided between the stem 60 and the opening 62 in the sleeve 41 to pack between these parts.

The tapered head or tip 60 is shown formed separate from the shank 60, in which case it may be attached to a shank through a threaded connection 65. With this construction it is practical to form the head 61 of a hard or wear resisting material that does not cut out as the structure operates.

The shank 60 is slidable in the sleeve 41 between a retracted position such as is shown in Fig. 1 of the drawings, and various operating positions where it approaches the seat 31. It will be apparent that as the head 61 approaches the seat 31 the opening through the structure is cut down or restricted. The head 61 may be moved into engagement with the seat 31 in which event the regulating valve serves as a closure or shut-off and in this condition it may aid or supplement the action of the shut-off valve D.

The operating means for the valves C and D are preferably combined in a unit or assembly confined to the extension 14 of the body, and there is an operating means for each of the valves, the two operating means being entirely independent in operation. In the case illustrated there is an operating means B provided for operating the regulating valve C and there is an operating means E for the shut-off valve. In accordance with the broader principles of the invention the operating means B and E may be of any suitable form or type. For purpose of example one of the operating means is shown as a mechanical manually operated means while the other is shown as a fluid pressure actuated means.

The means B shown for operating the regulating valve C is a mechanical means, preferably a screw mechanism, while the means E for operating the shut-off valve is shown as a fluid pressure actuated mechanism suitable for operation by means of pressure supplied from a point remote from the structure.

The means B, as shown in Figs. 1 to 3 of the drawings, includes a stem 70 rigidly joined to and projecting upward from the shank 60 of valve C, a removable operator 74 which may be in the form of a socket wrench, lock means 78, and a closure 100. The upper end portion 71 of the stem 70 is externally threaded and is engaged in an opening 72 provided in the cap 16, which opening is concentric with the cylindrical part 15, as shown in Fig. 1 of the drawings. In the particular form of the invention illustrated the stem 70 is rigid and concentric with the shank 60 of the valve C but is formed separate therefrom, the two parts being suitably connected by a threaded connection 80.

In the drawings I have shown the operator 74 separate from the other parts and in position ready to be advanced into engagement with the upper end of stem 70. Stem 70 is provided in its upper end with a polygonal socket 75 for receiving a polygonal head 79 on the end of the operator 74.

The lock means 78 is in the form of a plug or screw threaded into the opening 72 of the cap 16 above the stem and has a polygonal socket 75a in its upper end to be engaged by the operator 74.

The operator 74 of the means B involves an elongate body 76, round in cross-section, and having a diameter less than that of the threaded opening 72 in the cap 16 so it can be readily inserted into the cap from the upper end thereof. The body 76 is provided at its lower end with a polygonal head 79 for engaging the sockets 75 and 75a of the stem 70 and lock means 78, respectively. The upper end of the body 76 is provided with a hand wheel 79a, or the like, so that it can be conveniently operated.

The closure 100 is provided at the upper end of cap 16, to be applied when the means B is adjusted and locked, and after the operator has been removed. The closure has a shank 101 threaded into the upper end of the opening 72 above the lock 78, and a polygonal head 102 carrying the shank and seating in the upper end of the cap 16. A seal 103 may be provided between the head 102 and cap 16.

The fluid pressure actuated means E provided for operating the shut-off valve D is in the nature of a cylinder and piston and in the construction illustrated the upper end portion X of the cylindrical extension 15 forms the cylinder while the top or upper end portion of flange 45 on sleeve 41 forms the piston which slides in the cylinder. When the sleeve 41 is in the uppermost or retracted position, as shown in Fig. 1, the piston is spaced from the upper end of the cylindrical portion X leaving a cylinder opening 80. A fluid or pressure carrying opening 81 extends from the exterior of the structure just described to the cylinder opening 80 above the piston, so that pressure from a line 82 may be supplied to the structure at will.

It will be apparent that the line 82 may be extended to any suitable point remote from the structure and when suitable pressure is supplied to the cylinder above the piston the piston and consequently the entire sleeve 41 is forced downward and through this action may be moved into positive seating engagement with the seat 32, in which position the sleeve 41 completely cuts off flow through the structure. When actuating pressure is relieved the spring 50 returns the sleeve 41 to the unactuated position shown in the drawings.

From the foregoing description it will be apparent that I have, by my present invention, provided a valve structure combining two valves, preferably a needle valve and a sleeve valve, in a unit so that they are independently operable. As an example of a typical use of the structure the regulating valve may be set to suitably control flow under normal working conditions. In the event that an emergency closure is required, fluid pressure may be introduced to the means E to act as above described, so that the sleeve 41 is moved down and into cooperative engagement with the seat. It will be apparent that the shut-off action gained through the valve D may be rapid and when the valve D is closed the structure operates to effectively stop any flow through the body. As has been suggested, both of the valves may be operated to and maintained in the closed position, if desired, in which case the action of one supplements that of the other.

In Figs. 4 to 6 of the drawings I have shown a form of my invention wherein I provide lubricating means L for the means operating the regulating valve and I provide for free rotation between the operating stem and the shank of the valve. In this form of the invention the body A' and the valves C' and D' correspond to the element A, C and D above described.

Means B' for operating the regulating valve C' involves generally a stem 70' having an externally threaded portion 71' preferably at its upper end, and a polygonal socket 75' for receiving the operator as above described. The means B' is coupled to the valve C' through a releasable swivel joint or connection 120 so that the operator is readily detachable from the valve shank 60' and so the stem and shank are free to turn relative to each other. The releasable connection involves a transverse slot 121 in the upper end portion of the shank 60' which slot extends radially from the central portion of the shank to the periphery thereof. A socket 122 is provided in the shank from the side thereof and adjacent the slot to be in communication therewith for receiving a head 123 carried by a lug 124 projecting from the lower end of stem 70'. The lug 124 enters the shank from the side and the head 123 is retained in the socket swivelly securing or coupling the parts together. Upon removal of the cap 16' from the body A' the stem 70' may be readily disengaged from the shank 60'.

The lubricating means that I have provided involves generally a sleeve 130, a sleeve anchor 135, a sleeve retainer 140, and a lubricating fitting 145 for introducing lubricant to the means L.

As shown in Fig. 4 of the drawings the means L is confined to the cap 16' where the operating means B' is located. The cap 16' has a central bore 125 entering it from its lower end and terminating in a downwardly facing shoulder 126 near its upper end. Sleeve 130 occupies the bore 125 so that its upper end face 131 abuts the shoulder 126. Anchor 135 is shown as a key and may be suitably located to prevent rotation between the sleeve and cap. Anchord 135 is shown engaged in suitable keyways in the sleeve and cap.

Sleeve 130 is internally threaded and the threads 132 are engaged by the threaded portion 71' of stem 70'. The sleeve retainer 140 is shown as a ring screw threaded into the lower end of cap 16' forcibly clamping the sleeve into engagement with shoulder 126 so that the sleeve is confined to the cap. The retainer may be provided with suitable packing, as at 141 and 142. In this form of the invention the part or extension 52ª of operator D terminates immediately below the retainer 140 when the operator is up as shown in Fig. 4.

A chamber 133 is provided between the sleeve 130 and bore 125 by a recess 134 in the sleeve. The recess extends between the enlarged end portions of the sleeve and the chamber is in communication with the interior of the sleeve through lateral ports 129 between the recess and threaded interior. Lubricant introduced through fitting 145 fills the chamber and lubricates the means B' by passing through the ports 129. From the above description of means B' and L it will be apparent that I have provided simple and effective means for dismantling parts of the valve and for lubricating the operating means and also that I have provided an effective swivel connection between the stem and valve shank.

Having described only typical preferred forms and applications of the invention, I do not wish to be limited or restricted to the specific details herein set forth, but wish to reserve to myself any variations or modifications that may appear to those skilled in the art and fall within the scope of the following claims.

Having described my invention, I claim:

1. A structure of the character described including, a body having angularly related ducts in communication with each other and having a lateral extension, two valves carried by the extension each controlling flow through the body from one duct to the other, and two separate operating means for the valves operating independently of each other one adapted to operate one valve relative to the body and independently of the other valve and the other means, and said other means being adapted to operate the other valve relative to the body and independently of the first mentioned means, one of the valves being of the needle type regulating valve and the other being of the sleeve type shut off valve.

2. A structure of the character described including, a body having angularly related ducts in communication with each other and having a lateral extension, two valves carried by the extension each controlling flow through the body from one duct to the other, one of the valves including a sleeve slidably supported by the body and the other including a needle member slidably supported by the sleeve, manually operated means adapted to operate the needle member, and fluid pressure actuated means adapted to operate the sleeve.

3. A structure of the character described including, a body having angularly related ducts in communication with each other and having a lateral extension, two valves carried by the extension and shiftable relative to each other to each control flow through the body from one duct to the other, operating means for the valves operating the valves independently of each other, and a seat member detachable from the body and carried in one of the ducts of the body and cooperating with both of the valves to seal therewith.

4. A structure of the character described including, a body having angularly related ducts in communication with each other and having a lateral extension, two concentric angularly related valves carried by the extension each controlling flow through the body from one duct to the other, operating means for the valves operating the valves independently of each other, a sleeve member confined in one of the ducts of the body and cooperating with both of the valves, and means engaging the outer end of the sleeve member and releasably retaining the sleeve member in said duct with its inner end opposed to the both of the valves to be engaged thereby.

5. A structure of the character described including, a body having two angularly related ducts joined by a chamber and having a lateral extension projecting from the chamber in line with one of the ducts, a seat sleeve detachably mounted in said duct and having concentric seats at one end opposing the extension, means releasably retaining the sleeve in said duct, a sleeve valve slidably carried by the extension concentric with the sleeve and movable into engagement with the outermost of the seats, a needle valve slidably carried in the sleeve valve concentric therewith and movable into engagement with the other seat, and independent operating means, one for each valve whereby each of the valves is adapted to be operated independent of the other.

6. A structure of the character described including, a body having two angularly related ducts joined by a chamber and having a lateral extension projecting from the chamber in line with one of the ducts, a valve sleeve detachable from the body and confined in said duct and having concentric seats at its inner end opposing the extension, a sleeve valve slidably engaged in the extension and movable into engagement with the outermost of the seats, a needle valve slidable in the sleeve valve and movable into engagement with the other seat, and independent operating means carried by the extension of the body and adapted to move the valves independently of each other and relative to the seats, one of the operating means being operated manually and the other being fluid pressure actuated.

7. A structure of the character described including, a body having two angularly related ducts joined by a chamber and having a lateral extension projecting from the chamber in line with one of the ducts, the extension including a cylindrical part and a cap on said part, a sleeve in said duct with seats opposing the extension, a sleeve valve confined within the body and slidably carried by the cylindrical part of the extension and movable into engagement with one of the seats, a needle valve slidably carried in the sleeve valve and movable into engagement with another seat, and operating means carried by the cap and extending from a point accessible from the exterior of the body to the needle valve and connected therewith.

8. A structure of the character described including, a body having two angularly related ducts joined by a chamber and having a lateral extension projecting from the chamber in line with one of the ducts, the extension including a cylindrical part and a cap on said part, a seat sleeve in said duct with annular seats opposing the extension, one of the seats being within the other, means releasably retaining the sleeve in said duct, a sleeve valve slidably carried by the cylindrical part of the extension and movable into engagement with the outermost seat, a needle valve slidably carried by the sleeve concentric therewith and to shift relative thereto and being movable into engagement with the innermost seat, valve operating means carried by the cap adapted to move the needle valve relative to the sleeve, and fluid pressure operated means adapted to move the sleeve valve relative to the seat sleeve.

9. A structure of the character described including, a body having two angularly related ducts joined by a chamber and an extension including a cylinder projecting from the chamber opposite and in line with one of the ducts and a cap on the cylinder, a removable liner in said duct with concentric seats at its inner end one within the other and both opposing the cylinder, a sleeve valve slidable in the cylinder and adapted to move into and out of engagement with the outermost seat, a fluid pressure line connected to the upper end of the cylinder above the sleeve, a needle valve slidable in the sleeve valve and adapted to move into and out of engagement with the other seat, and a screw carried by the cap and extending from a point accessible from the extension of the body to the needle valve and connected thereto, the cylinder being closed by the cap so fluid pressure admitted thereto through the line operates the sleeve into engagement with the said outermost seat.

10. A structure of the character described including, a body having two angularly related ducts joined by a chamber and an extension including a cylinder projecting from the chamber opposite and in line with one of the ducts and a cap on the cylinder, a liner removable from the body and located in said duct with concentric seats at its inner end one within the other and both opposing the cylinder, means releasably retaining the liner in said duct, a sleeve valve slidable in the cylinder and adapted to operate into and out of engagement with the outermost seat, a spring in the cylinder normally yieldingly urging the sleeve valve away from the said outermost seat, a needle valve slidably supported in the sleeve valve and adapted to operate into and out of engagement with the other seat, and a screw carried by the cap and operatively connected to the needle valve.

11. In a structure of the character described, a body having a laterally projecting part with a bore therein, a sleeve secured in the bore, two concentric slidably related valves in the body, one a sleeve type shut off valve and the other a needle type regulating valve with a shank, an operating stem threaded in the sleeve, and means swivelly connecting the stem and the shank.

12. In a structure of the character described, a body having a projecting part with a bore therein, an internally threaded sleeve in the bore, a retainer holding the sleeve in the bore, a key holding the sleeve against rotation in the bore, two concentric slidably related valves in the body, one a regulating valve with a shank, and an operating stem threaded in the sleeve and swivelly connected to the shank.

References Cited in the file of this patent

UNITED STATES PATENTS

| Number | Name | Date |
|---|---|---|
| 628,060 | Zorn | July 4, 1899 |
| 679,927 | Warman | Aug. 6, 1901 |
| 791,548 | Fisher | June 6, 1905 |
| 801,514 | Dexter | Oct. 10, 1905 |
| 1,047,774 | Eynon | Dec. 17, 1912 |
| 1,392,456 | Spatter | Oct. 4, 1921 |
| 1,542,570 | Mueller | June 16, 1925 |
| 1,568,057 | Carr | Jan. 5, 1926 |
| 1,590,068 | Albrecht | June 22, 1926 |
| 1,637,230 | Mueller | July 26, 1927 |
| 1,668,859 | McCorkle | May 8, 1928 |
| 1,733,421 | Mauran | Oct. 29, 1929 |
| 1,753,154 | Martus | Apr. 1, 1930 |
| 1,785,475 | Bliven | Dec. 16, 1930 |
| 1,793,514 | Schwendner | Feb. 24, 1931 |
| 1,900,764 | Rowley | Mar. 7, 1933 |
| 2,079,195 | Yancey | May 4, 1937 |
| 2,173,819 | Boldt | Sept. 26, 1939 |